(12) United States Patent
Farley

(10) Patent No.: US 10,164,510 B1
(45) Date of Patent: Dec. 25, 2018

(54) LOW RESISTANCE GENERATOR

(71) Applicant: Daniel Farley, Ogden, UT (US)

(72) Inventor: Daniel Farley, Ogden, UT (US)

(73) Assignee: Daniel Farley, Ogden, UT (US)

( * ) Notice: Subject to any disclaimer, the term of this patent is extended or adjusted under 35 U.S.C. 154(b) by 0 days.

(21) Appl. No.: 15/716,943

(22) Filed: Sep. 27, 2017

(51) Int. Cl.
*H02K 7/20* (2006.01)
*H02K 21/16* (2006.01)
*H02K 1/18* (2006.01)
*H02K 99/00* (2014.01)

(52) U.S. Cl.
CPC .............. *H02K 21/16* (2013.01); *H02K 1/18* (2013.01); *H02K 99/10* (2016.11); *H02K 2201/03* (2013.01)

(58) Field of Classification Search
CPC ....... H02K 1/18; H02K 99/10; H02K 2201/03
USPC .......................................... 310/112, 113, 114
See application file for complete search history.

(56) References Cited

U.S. PATENT DOCUMENTS

| | | | | |
|---|---|---|---|---|
| 5,184,040 A * | 2/1993 | Lim | ....................... | H02K 21/24 310/114 |
| 5,396,140 A * | 3/1995 | Goldie | ................... | H02K 17/16 310/114 |
| 5,982,074 A * | 11/1999 | Smith | ...................... | H02K 3/04 310/156.36 |
| 7,081,696 B2 * | 7/2006 | Ritchey | ................... | H02K 7/108 310/112 |
| 7,646,178 B1 | 1/2010 | Fradella | | |
| 7,777,391 B2 | 8/2010 | Asano | | |
| 8,115,364 B2 | 2/2012 | Minowa et al. | | |
| 8,334,634 B2 * | 12/2012 | Palmer | ................... | H02K 21/24 310/266 |
| 8,536,747 B1 | 9/2013 | Baggett | | |
| 2013/0234818 A1 | 9/2013 | Garcia | | |

* cited by examiner

*Primary Examiner* — Hanh Nguyen
(74) *Attorney, Agent, or Firm* — Workman Nydegger

(57) ABSTRACT

A low resistance generator includes a series of stator plates and rotors. Stator plates include the coils wrapped around coil spools. The stator plates and coil spools are made from non-conductive and non-ferromagnetic material. The coils are exposed to the surrounding air and cooled convectively by airflow caused by a rotation of the rotors in the gaps. Rotors house magnets and are disposed within gaps between the stator plates. The rotors are also made of non-conductive and non-ferromagnetic materials. The magnets may be disposed on the rotors to form columns. Two columns of magnets are joined together to form one or more closed magnetic loops, each column being joined by a gauss bridge disposed at first and second end rotors.

13 Claims, 7 Drawing Sheets

LOW RESISTANCE GENERATOR

BACKGROUND

1. Technical Field

The present disclosure relates to electric generators. More specifically, the present disclosure relates to an apparatus for efficient electrical generation.

2. The Relevant Technology

As known to those skilled in the art, electric generators are electro-mechanical devices that convert mechanical energy into electric energy. The efficiency of a generator, or how much electricity can be converted from a given amount of mechanical energy, depends on the resistance of the generator. Decreasing the resistance of the generator increases its efficiency. There are many sources of resistance within a generator.

For example, friction between the shaft and bearings of the generator and or windage created by friction between moving components of the generator and surrounding air are common sources of resistance. Another source of resistance within a generator is magnetic attraction between moving and stationary parts. This attraction creates a rotational resistance that increases with the strength of the magnetic field. This resistance originates near the outer surface in many generators, and the greater the distance of this resistance from the shaft (e.g., radius of the rotors) the more leverage this resistance exerts. This leveraged resistance creates a design limitation for rotor and/or stator size.

Heat generated electrical resistance can also play a role. Heat may be generated in a number of components, but is commonly generated in the coils as electricity is generated. Substantial resistance may occur, for example, with a heat gain of 40 degrees Celsius. This amount of heat generation is typical in current generator designs.

Another source of resistance is the counter electromotive force (CEMF) generated within the generator. CEMF is generated when electrically conductive materials used in the frame or enclosure of the generator creates a circuit. Induced currents within this circuit generate competing magnetic fields that oppose the current being generated in the coils of the generator.

Yet another form of resistance comes from gauss leakage. Gauss can be thought of as the magnetic flux density on the surface of a magnet. One gauss in the centimeter-gram-second unit system is equal to $1 \times 10^{-4}$ tesla. Gauss ratings are based on the magnetic flux density at the surface of the magnetic pole of a magnet. As soon as the gauss leaves the surface of the magnet, the flux density declines rapidly. For example, the gauss of a neodymium magnet is reduced by almost 50% when measured only 0.0625-inches away from the surface of the magnet. Gauss measured 0.125-inches from the surface of a magnet is reduced by over 65%. This loss is known as gauss leakage. Gaps between magnets that provide space for stators and/or coils between the rotors result in gauss leakage.

Reluctance of air in the gaps between magnets within the generator is also a source of resistance. Reluctance is the reciprocal of permeance, and permeance is the relative ease with which flux passes through a given material or space. The permeance of neodymium, for example, is 13.2 kilogauss, but the permeance of air is 1 gauss. When permeance is very low, the reluctance is very high.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The present disclosure addresses at least some of the foregoing shortcomings by providing a low resistance generator that substantially reduces many of the sources of resistance within a typical generator discussed above.

In one embodiment, a low resistance generator includes two or more rotors connected perpendicular to a generator shaft. The rotors can be disposed in series with a gap separating each rotor. The rotors are advantageously made of non-conductive material. The rotors each carry two or more magnets secured to the shaft so that they rotate with the shaft. A stator is disposed within the gaps between the rotors. The stators are configured to carry one or more coils that are wired together in series. The generator also includes a frame that is made of non-conductive material.

In another embodiment, a low resistance generator includes a generator shaft, a series of rotors connected to the generator shaft, with a first end rotor and a second end rotor. A plurality of magnets are attached to each of the rotors. The rotors are radially positioned on the shaft so that two or more columns of magnets extend from the first end rotor to the second end rotor, parallel to the shaft. One or more gauss bridges are disposed at each of the first and second end rotors. The gauss bridges bridge two magnets attached to the rotors so that two columns of magnets are connected through the gauss bridge. Each gauss bridge at one end rotor has a corresponding gauss bridge at another end rotor that connects the same two columns of magnets. The gauss bridges create a closed loop of two columns of magnets.

Another embodiment of a low resistance generator includes two or more rotors connected to a generator shaft. The rotors are disposed in series with a gap between each rotor. A plurality of magnets are disposed on each rotor and arranged radially around the generator shaft. The generator also includes a stator disposed within the gaps between the rotors and one or more coils disposed on the surface of each stator. The coils are configured so that they are exposed to the ambient air.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the disclosed embodiments will be set forth in the description which follows, and in part will be obvious from the description, or may be learned by the practice of the disclosure. These and other features will become more fully apparent from the following description and appended claims, or may be learned by the practice of the present disclosure.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1A:
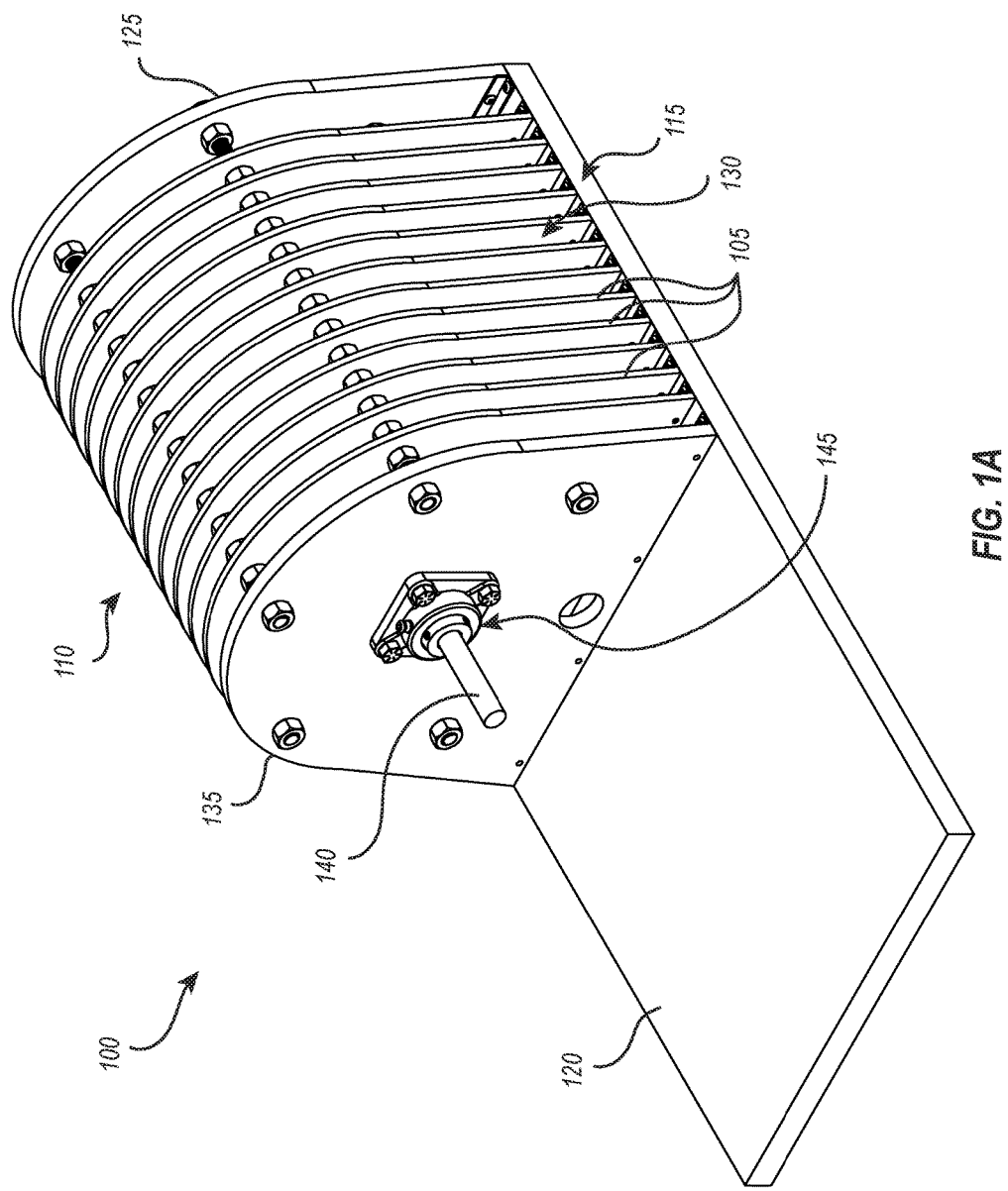
FIG. 1A illustrates a perspective view of an embodiment of a low resistance generator.

The present disclosure addresses at least some of the foregoing shortcomings by providing a low resistance generator that substantially reduces many of the sources of resistance within a typical generator discussed above.

In one embodiment, a low resistance generator includes two or more rotors connected perpendicular to a generator shaft. The rotors can be disposed in series with a gap separating each rotor. The rotors are made of non-conductive material. The rotors each carry two or more magnets secured to the shaft so that they rotate with the shaft. A stator is disposed within the gaps between the rotors. The stators are configured to carry one or more coils that are wired together in series. The generator also includes a frame that is made of non-conductive material.

In another embodiment, a low resistance generator includes a generator shaft, a series of rotors connected to the generator shaft, with a first end rotor and a second end rotor. A plurality of magnets are attached to each of the rotors. The rotors are radially positioned on the shaft so that two or more columns of magnets extend from the first end rotor to the second end rotor, parallel to the shaft. One or more gauss bridges are disposed at each of the first and second end rotors. The gauss bridges bridge two magnets attached to the rotors so that two columns of magnets are connected through the gauss bridge. Each gauss bridge at one end rotor has a corresponding gauss bridge at another end rotor that connects the same two columns of magnets. The gauss bridges create a closed loop of two columns of magnets.

Another embodiment of a low resistance generator includes two or more rotors connected to a generator shaft. The rotors are disposed in series with a gap between each rotor. A plurality of magnets are disposed on each rotor and arranged radially around the generator shaft. The generator also includes a stator disposed within the gaps between the rotors and one or more coils disposed on the surface of each stator. The coils are configured so that they are exposed to the ambient air.

The present disclosure addresses at least some of the foregoing shortcomings by providing a low resistance generator that substantially reduces many of the sources of resistance within a typical generator discussed above. For example, by placing all the magnets on the same surface, and reducing the amount of ferromagnetic materials in the generator, much of the resistance due to the magnetic attraction between moving and stationary parts may be reduced or eliminated.

In addition, exposing the coils to ambient air, and not burying them in grooves or other compartments within the thickness of the stator, allows air to blow over the coils as the rotors rotate. The air may cool the coils so that heat Ohms of resistance from current generated in the coils may be substantially reduced.

Resistance due to CEMF is reduced by the use of non-conductive materials throughout the generator. Without a current flowing through these materials, little or no CEMF may be produced.

When the magnets are configured into closed loops comprising two columns of magnets connected by gauss bridges, as detailed in embodiments described above, the magnets function as a single unit without gaps. Reluctance in the air gaps between magnets within this closed-loop column configuration is substantially diminished by the combined force of the magnets. This configuration has not only been shown to eliminate gauss leakage, but significantly enhance the gauss rating of the magnets.

FIG. 1 illustrates a perspective view of an embodiment of a low resistance generator. The generator may include a stator 110 connected to a frame 115. The frame 115 may include a base plate 120 and first and second end plates 125, 135. In some embodiments, the first and second end plates 125, 135 may include apertures or windows where material has been removed to promote ventilation and airflow through the gaps 130 and other areas of the generator 100.

The stator 110 may include one or more stator plates 105. In the embodiment illustrated in FIG. 1A, the generator 100 includes 12 stator plates 105. Other embodiments may include more or fewer than 12 stator plates. The frame 115 may be made of non-ferromagnetic and non-conductive materials to reduce resistance due to CEMF and magnetic attraction of components, as discussed herein.

The stator plates 105 may be arranged in series so that they are disposed substantially perpendicular to the base plate 120 with a gap 130 between each stator plate 105. The stator plates 105 may also be disposed substantially perpendicular to a generator shaft 140. The shaft 140 may pass through the stator plates 105 and the first and second end plates 125, 135 so that the shaft 140 rotates freely while the stator plates and end plates 125, 135 remain fixed. The shaft 140 may be supported by ball bearing assemblies 145 disposed within the first and second end plates 125, 135 of the frame 115.

Figure 1B:
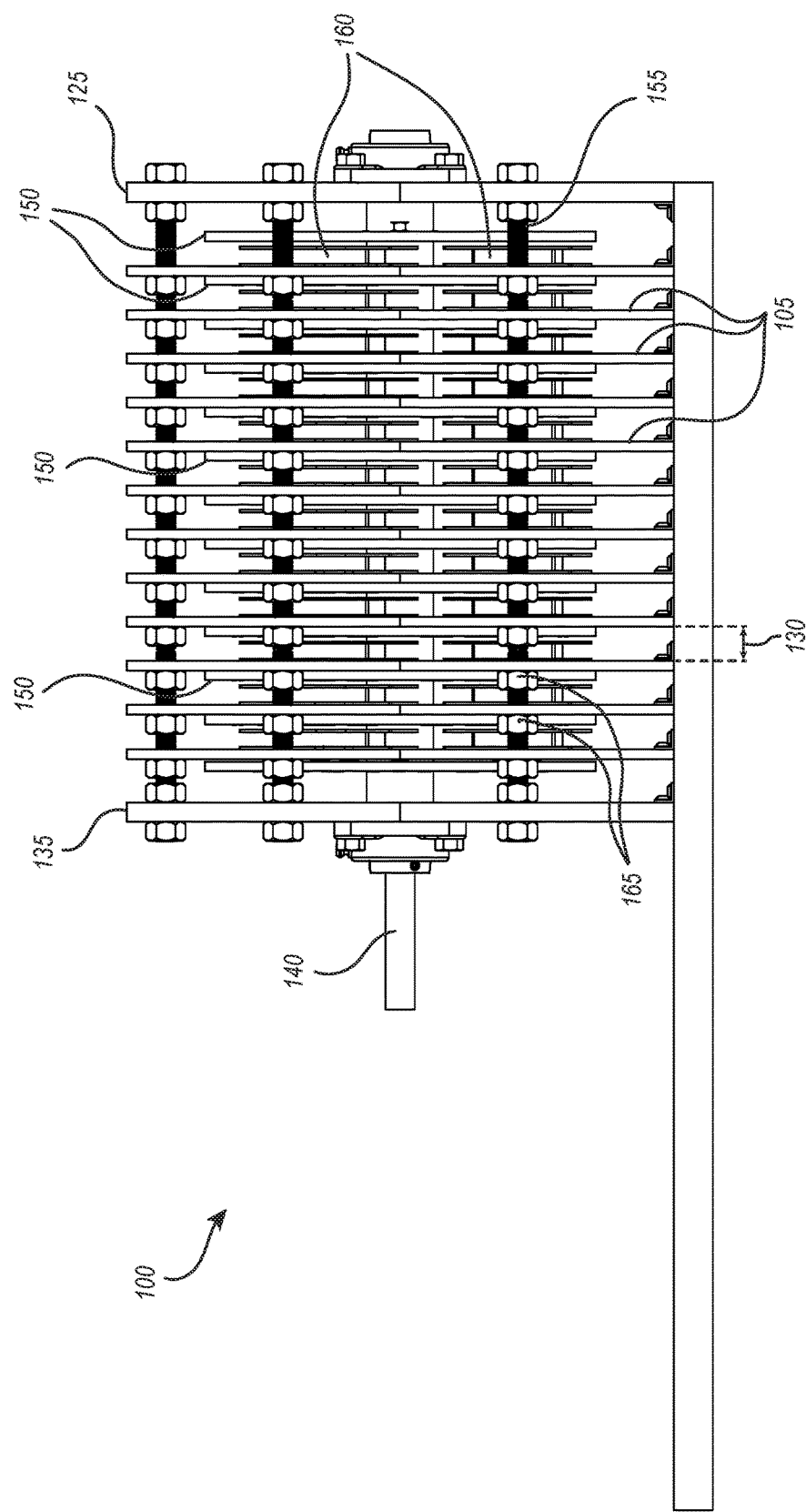
FIG. 1B illustrates a side view of the embodiment of a low resistance generator illustrated in FIG. 1A.

FIG. 1B illustrates a side view of the low resistance generator 100 illustrated in FIG. 1A. The generator 100 may include one or more rotors 150. The rotors 150 may be secured to the shaft 140 and disposed in the gaps 130 between the stator plates 105. The rotors 150 rotate when the shaft 140 rotates. The rotors 150 may be secured to the shaft 140 so that they are substantially perpendicular to the shaft 140.

The number of rotors 150 may depend on the number of stator plates 105. In an exemplary embodiment, the generator 100 may have one more rotor 150 than stator plate 105. For example, in the embodiment illustrated in FIG. 1B, the generator 100 includes twelve stator plates 105 and thirteen rotor plates 105. This number of rotors 150 and stator plates 105 provides for one rotor 150 disposed in each gap 130, with two additional rotors 150. One of the two additional rotors 150 may disposed between a stator plate 105 and the first end plate 125. A second rotor 150 may be disposed between a stator plate 105 and the second end plate 135.

A number of threaded rods 155 may pass through the stator plates 105 and be secured via bolts 165 at various locations. The rods 155 and nuts 165 may provide structural stability to the stator plates 105. Other structural components, such as brackets, screws, nails, adhesives, and the like, may also be employed to add structural stability to the stator plates 105 and/or various other components of the generator 100.

FIG. 1B also illustrates a plurality of coil spools 160, which may be secured to the stator plates 105. Coils or coiled wires (not illustrated here) may be wrapped around the coil spools 160. Magnets (not illustrated here) may be disposed on the rotors 150 and positioned to pass near the coils when rotated. More detail regarding the coil spools 160, coils, and magnets will be given hereafter.

A motive force such as wind, water, steam, turbine, or internal combustion piston may cause the shaft 140 to rotate. For a non-limiting example, the shaft 140 may be connected to a windmill, hydraulic turbine, or other commonly used turbine such as a steam turbine. The rotation of the shaft 140 causes the rotors 150 to rotate while the stator plates 105 remain fixed. Magnets may be arranged on the rotors 150 so that the rotation of the magnets induces electric current to flow through the coils disposed on the coil spools 160. More detail regarding the configuration of the coil spools 160, coils, and magnets will be given hereafter.

The embodiment of the generator 100 illustrated in FIGS. 1A and 1B may be modular so that two or more generators 100 may be wired in series. For example, each generator 100 may be 125-volt, 16-amp generators. Wiring two of these generators 100 together in series on a single shaft 140 results in a 250-volt, 32-amp generator. Also, the generators described in various embodiments herein may be oriented horizontally or vertically as needed.

Figure 2A:
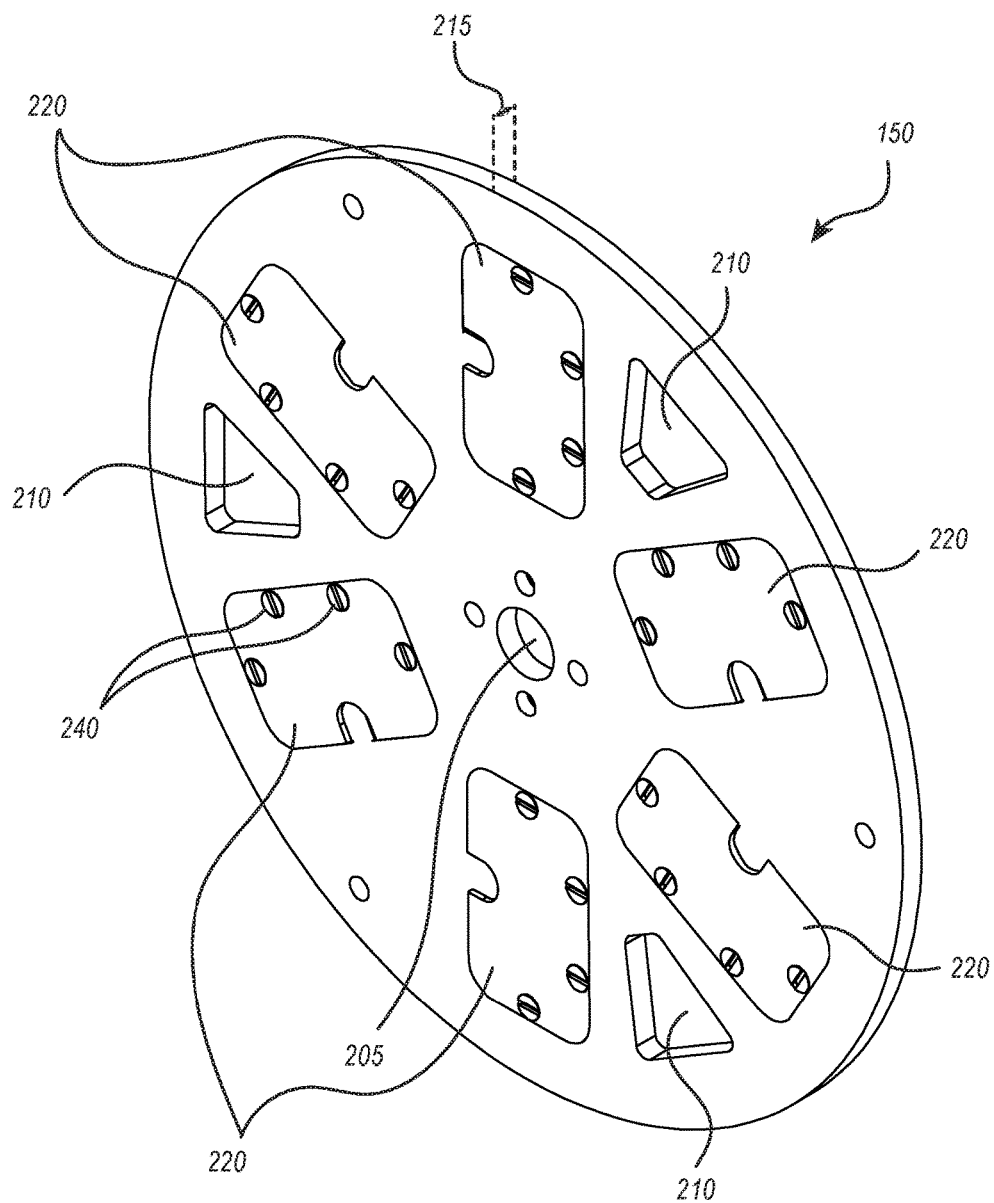
FIG. 2A illustrates a perspective view of an embodiment of a rotor.

FIG. 2A illustrates a perspective view of an embodiment of a rotor 150. The rotor 150 may include a central hole 205 through which the shaft 140 may pass and secure to the rotor 150. The rotor 150 may also include a number of windows 210 where material has been removed to reduce weight and material costs, and to increase ventilation within the gaps 130 to cool the coils. The rotor 150 may include a number of magnets disposed within a thickness 215 of the rotor 150. The magnets are not shown in the embodiment illustrated in FIG. 2A because each magnet may be covered with a magnet box cover 220 or other magnet securing means. The box covers 220 may be secured to the rotor 150 via one or more screws 240 or other attachment means.

Figure 2B:
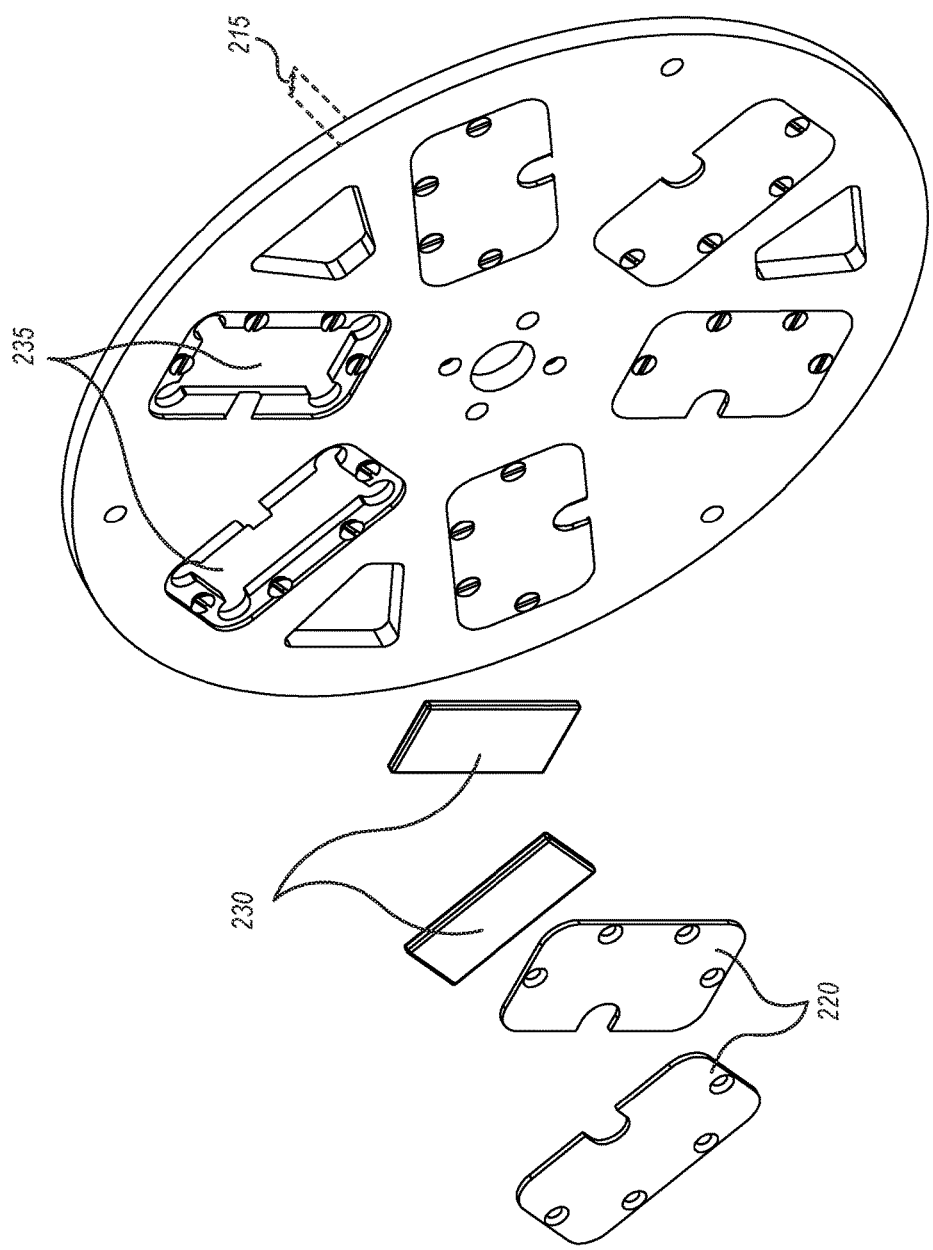
FIG. 2B illustrates an exploded view of the embodiment of a rotor illustrated in FIG. 2A.

FIG. 2B illustrates an exploded view of the rotor 150 illustrated in FIG. 2A where one pair of box covers 220 and magnets 230 are shown. The rotor 150 may comprise recessed boxes 235 configured to house magnets 230. The magnets 230 in the illustrated embodiment of FIG. 2B are rectangular and correspond to the rectangular shape of the recessed boxes 235. The dimensions of the recessed boxes 235 and the magnets 230 may be substantially similar so that the magnets fit snuggly into the recessed boxes 235 and are not jostled due to a rotation of the rotor 150. The box covers 220 may be secured over the top of the magnets 230 disposed within the recessed boxes 235 to secure the magnets 230 within the thickness 215 of the rotor 150.

The rotors 150 may be made of non-conductive and/or non-ferromagnetic materials, such as plastics, resins, rubbers, or other non-conductive materials. Non-conductive materials may reduce the presence of CEMF and thus reduce resistance in the generator due to opposing magnetic fields. Little or no CEMF may be present with non-conductive materials used throughout the generator, including the rotors 150. The non-ferromagnetic materials used may also substantially decrease resistance due to attraction between various part of the generator 100 and the magnets 230, such as the rotors 150 and the magnets 230.

The rotor 150 illustrated in FIG. 2B includes six magnets 230 configured into three pairs of two. Other embodiments may include more or less than six magnets. For example, one embodiment may include eight magnets configured into four pairs of two, or four magnets configured into two pairs of two. Other embodiments may include less than four magnets or more than eight magnets. Preferably, an even number of magnets may be secured to a rotor, the reason for which will be explained in detail below.

The magnets 230 may be neodymium magnets with a permeance of about 13,200 henry (H). The magnets 230 illustrated in FIG. 2B are 1"×2"×0.125". The thickness, shape, material, and permeance of the magnets 230 may vary in various embodiments contemplated herein.

Figure 3:
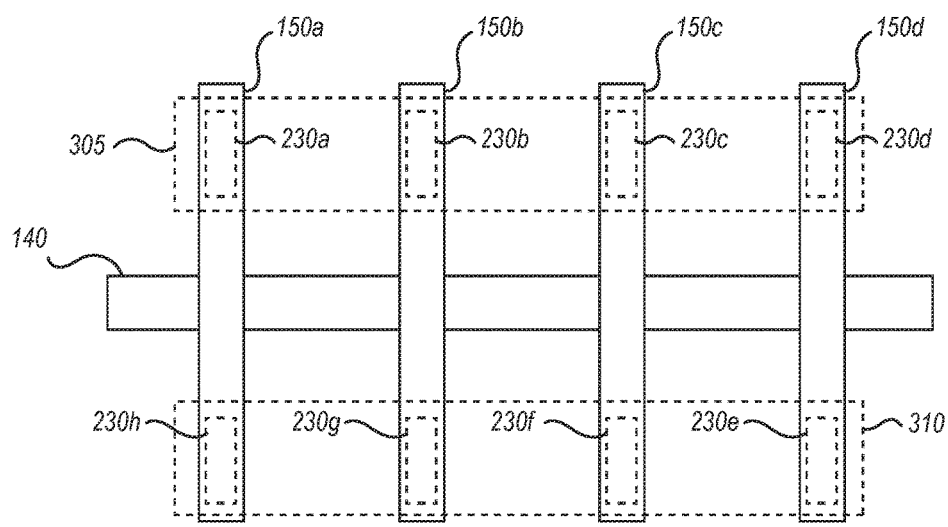
FIG. 3 illustrates a series of rotors disposed on a shaft forming magnetic columns.

FIG. 3 illustrates a schematic representing a side view of a series of rotors 150*a-d* disposed on a shaft 140. A plurality of magnets 230*a-h* may be disposed within the rotors 150*a-d* as described above, in reference to FIG. 2B. The rotors 150*a-d* may be disposed on the shaft 140 so that the angular position of the rotors 150*a-d* are substantially similar. The rotors 150*a-d* may be thus positioned so that the magnets 230*a-h* form columns. For example, as illustrated in FIG. 3, the rotors 150*a-d* may be angularly positioned so that magnets 230*a*, 230*b*, 230*c*, and 230*d* align to form a first column 305. Magnets 230*e*, 230*f*, 230*g*, and 230*h* align to form a second column 310.

Figure 4A:
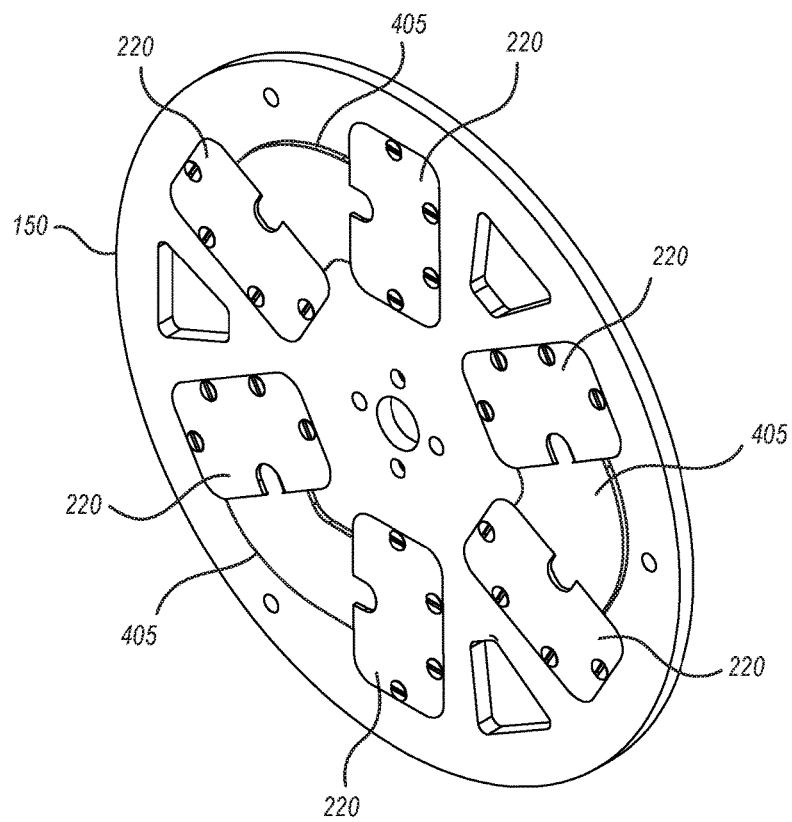
FIG. 4A illustrates a perspective view of an embodiment of a rotor including gauss bridges disposed thereon.

FIG. 4A illustrates a rotor 150 comprising a plurality of gauss bridges 405 disposed over each pair of magnets 230. A pair of box covers 220 may be secured to the rotor 150 over both ends of the gauss bridges 405 to hold the gauss bridges 405 against the magnets 230. Each gauss bridge 405 may contact two magnets 230. A gauss bridge 405 may be made of a ferromagnetic material so that it directs a magnetic flux from one magnet 230 of a pair of magnets on the rotor 150 to the other magnet 230 of the pair of magnets. FIG. 4 illustrates an embodiment of a rotor 150 that includes three gauss bridges 405.

The three gauss bridges 405 may create a flywheel effect that smoothes the output of the generator 100 while loads are added to or removed from the generator circuit. The use of three gauss bridges 405 may also prevent a circuit in which eddy currents may form, that causing CEMF. The number of gauss bridges may vary depending on the number of magnets 230 disposed on the rotor 150. There may be one gauss bridge 405 for every pair of magnets 230 on a rotor 150.

Figure 4B:
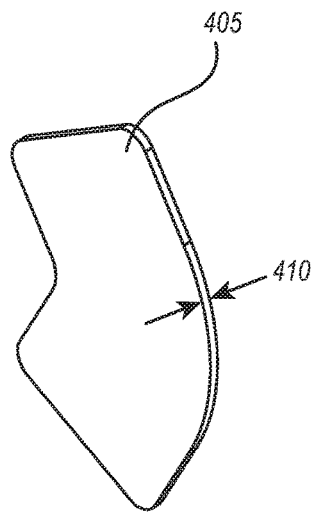
FIG. 4B illustrates a perspective view of the gauss bridges illustrated in FIG. 4A.
Figure 4C:
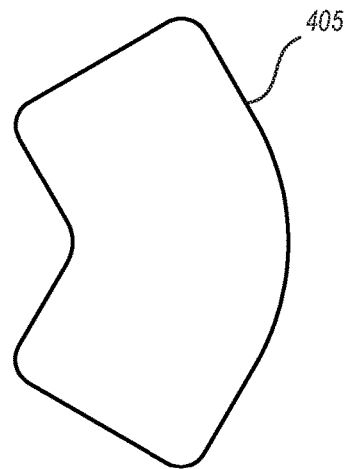
FIG. 4C illustrates a top view of the embodiment of a gauss bridge illustrated in FIG. 4B.

FIGS. 4B and 4C illustrate one embodiment of a gauss bridge 405 as illustrated in FIG. 4A. FIG. 4B illustrates a perspective view of the gauss bridge 405. The gauss bridge 405 may be made of a ferromagnetic material. In one embodiment, the gauss bridge 405 is made of cold-rolled steel. Other embodiments may include gauss bridges made of other ferromagnetic materials. For example, other embodiments of gauss bridges may be made of hot rolled steel or various iron alloys such as aluminum-nickel-cobalt (Alnico). The permeance of the gauss bridge 405 may depend, in part, on the material used.

A thickness 410 of the gauss bridge 405 may be 0.25 inches. Other embodiments may include gauss bridges that are thicker or thinner than 0.25 inches. The permeance of the gauss bridge 405 may depend, in part, on the thickness 410 of the gauss bridge 405. For example, the embodiment of the gauss bridge 405 illustrated in FIGS. 4A-C is made of cold rolled steel and has a thickness of 0.25 inches. A gauss bridge 405 such as this may have a permeance of 21,000 henry. Varying the thickness and materials used to manufacture the gauss bridge 405 may vary the permeance of the gauss bridge 405. Other embodiments may include gauss bridges with a permeance greater or less than 21,000 henry. Preferably, the permeance of the gauss bridge may be equal to or greater than a permeance of the magnets 230 with which the gauss bridge 405 makes contact.

The embodiment of the gauss bridge 405 illustrated in FIGS. 4A-C has a curved rectangular shape. The curved rectangle shape enables the gauss bridge 405 to conform radially to the circular shape of the rotor 150 while making good contact with the rectangular magnets 230 at each end of the gauss bridge 405. The shape of the gauss bridge 405 may therefore be different in embodiments where the shape of the magnets 230 and/or rotor 150 is different so that the gauss bridge 405 fits on the rotor and makes contact with a pair of magnets 230.

The shape and dimensions of the gauss bridge 405 discussed above are such that a total area of the gauss bridge 405 is no more than necessary to achieve a desired bridging effect between two magnets 230, as will be discussed in further detail below. The gauss bridge 405 is preferably made of a ferromagnetic material so that a magnetic field may pass through from one magnet 230 to another.

Three gauss bridges 405 are disposed on the embodiment of the rotor 150 illustrated in FIG. 4A. Other embodiments may include more or less than three gauss bridges 405 depending on how many magnets 230 are disposed on the rotor 150. Preferably, the end rotor 150 includes one gauss bridge 150 for every pair of two magnets 230. The three gauss bridges 405 shown are separate and do not contact one another. This configuration is advantageous because it reduces additional resistance due to CEMF.

For example, if one continuous metal plate were disposed on the rotor to serve as a gauss bridge between each pair of magnets 230, a current may be induced around the perimeter of that single piece of material as the generator shaft is rotated. This perimeter current would add to the CEMF resistance of the generator. In the separate, three-piece gauss bridge 405 of the embodiment illustrated in FIG. 4A, no such current may be formed. The three gauss bridges 405 are separate and cannot form a current carrying circuit.

Figure 5:
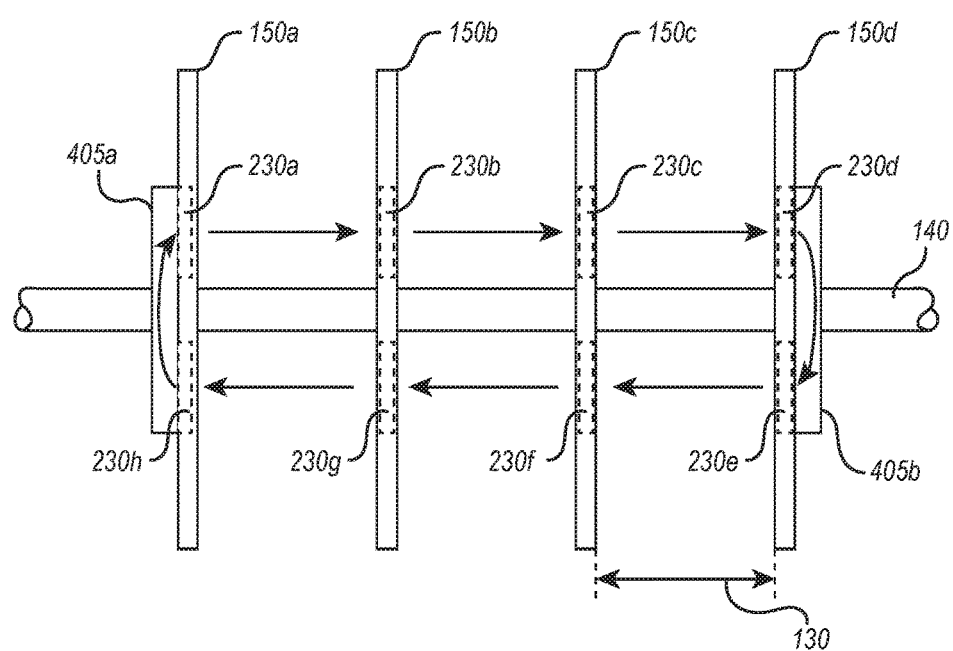
FIG. 5 illustrates series of rotors disposed on a shaft forming a closed magnetic loops including two columns connected by gauss bridges.

FIG. 5 illustrates a schematic representing a side view of a series of rotors 150a-d disposed on a shaft 140 similar to the schematic illustrated in FIG. 3. In one embodiment, illustrated in FIG. 5, one or more gauss bridges 405a, 405b may be disposed on a first end rotor 150a and a second end rotor 150d. Magnets 230a-230d form one column and magnets 230e-230h form a second column. The gauss bridges 405a, 405b may be disposed on the rotors 150a, 150d to make contact with two magnets each so that the two columns of magnets 230a-d, 230e-h are connected into a closed loop. For example, a first gauss bridge 405a may connect magnets 230a and 230h, and a second gauss bridge 405b may connect magnets 230d and 230e.

A closed loop comprising two columns of magnets may be formed by disposing gauss bridges 405a, 405b on first and second end rotors 150a, 150d in this way. The magnets 230a-h may be arranged so that the north and south poles of the magnets 230a-h cause a magnetic flux to travel around the closed loop. The direction of the magnetic flux is represented by the arrows in FIG. 5. The magnetic flux lines indicate that the magnetic field of the closed loop may travel from one magnet to the other down one column of magnets 230a-d and then transfer through the gauss bridge 405b and into the other column of magnets 230e-h. The magnetic field may then travel through the other gauss bridge 405a and again into the first column of magnets 230a.

When the magnets are configured into closed loops comprising two columns of magnets connected by gauss bridges, as detailed in embodiments described above, the magnets function as a single unit without gaps. Gaps 130 between stator plates 105 (see FIGS. 1A, 1B, 5) may be such that a distance between each magnet 230 within a column is about 0.875 inches. Other embodiments may include gaps 130 that are larger or smaller than 0.875 inches.

Reluctance in the air gaps between magnets within this closed-loop column configuration is substantially diminished by the combined force of the magnets. This configuration has not only been shown to eliminate gauss leakage, but significantly enhance the gauss rating of the magnets. For example, in one embodiment, the gauss ratings of the magnets 230 may be increased to 120% of the manufacturer's rating of the magnets. Other embodiments may include increased gauss ratings to more or less than 120%.

A test was run to illustrate this magnetic enhancement due to the column configuration of the magnets. Multiple neodymium magnets (1"×2"×0.125"), rated at 1150 henry by the manufacturer, were placed in columns connected by a gauss bridge of steel grade 1018, which has a permeance of 21.0 kilo-henry. Each magnet had an air gap between itself and adjacent magnets within the column. The gauss was measured at a distance from the surface of an individual magnet, the distance equal to the gap within the column. A 78.8% decrease in surface gauss was calculated at this distance using the magnet manufacturer's formula.

The gauss was then measured in the closed loop column configuration described above. The actual output (in volts) of the generator was multiplied by one hundred million gauss, which was adjusted for the RPMs and the number of wires in the coils as well as the number of magnets, to show the actual gauss in each gap. The results was 5.45 times the calculated gap gauss and 1.21 times the surface gauss rating published by the manufacturer.

Additionally, the power output of the generator increases as the thickness of the magnets increases. Gauss output is increased by 455.6% when the thickness of the magnets is increased by 8 (from 0.125" to 1"). The test described above included an equivalent of 13 times the original thickness because each column comprised 13 magnets. This increased the power output of the generator by 545%.

Figure 6:
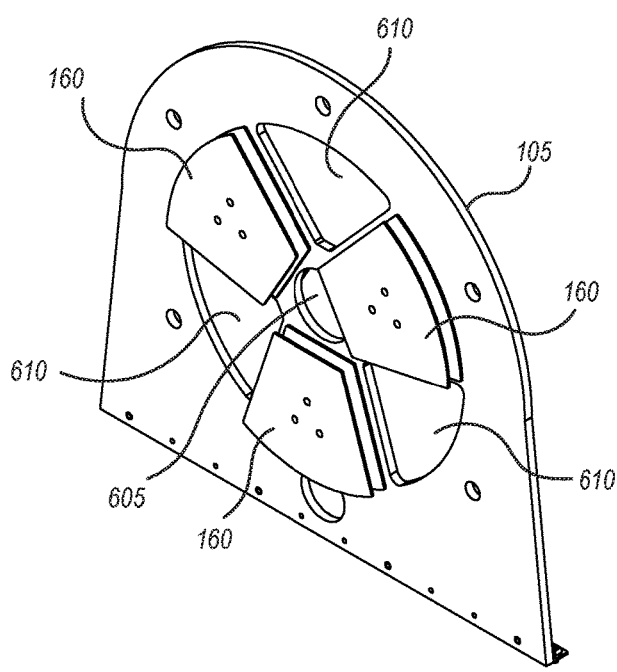
FIG. 6 illustrates a perspective view of an embodiment of a stator plate with coil spools disposed thereon.

FIG. 6 illustrates an embodiment of a stator plate 105. The stator plate 105 may include a central hole 605 through which a generator shaft 140 may freely pass. The stator plate may include a number of windows 610 where material has been removed to reduce weight and material costs, and to increase ventilation within the gaps 130 to cool the coils. The stator plate 105 may also include a plurality of coil spools 160 disposed on one or both sides of the stator plate 105. The stator plate 105 illustrated in FIG. 6 includes three coil spools 160. The coil spools 160 are configured to have coils of wire wrapped around them, as will be discussed in further detail below.

The coil spools 160 may be arranged radially around the center hole 605 and spaced evenly around the stator plate 105. It will be appreciated that the number and arrangement of the coil spools 160 may vary in different embodiments. The coil spools 160 may be arranged so that they correlate in position to the magnets 230 disposed in the rotors 150. This way, when the rotors 150 rotate within the gaps 103 between the stator plates 105, the magnets 230 will pass in close proximity to the coil spools 160, inducing an electrical current in the coils. The coil spools 160 may be similar in shape and/or size to the magnets 230 to aid in current being induced in the coils.

Figures 7A, 7B:
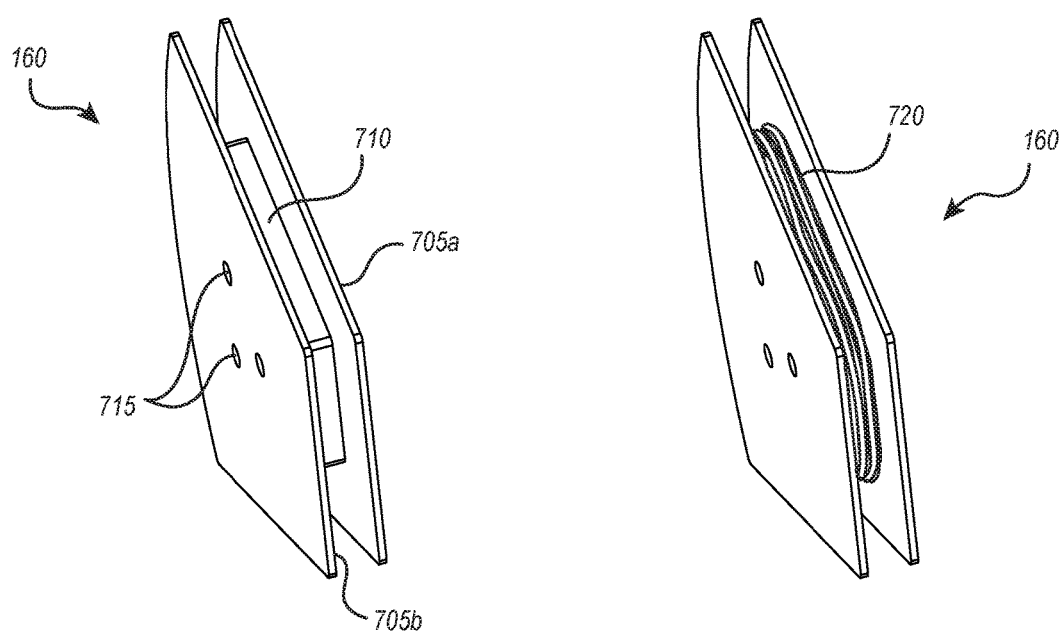
FIG. 7A illustrates a perspective view of an embodiment of a coil spool.
FIG. 7B illustrates a perspective view of the embodiment of a coil spool illustrated in FIG. 7A with a coil of wire wrapped around it.

FIGS. 7A and 7B illustrate perspective views of an embodiment of a coil spool 160. FIG. 7A illustrates a perspective view of a coil spool 160 without a coil, and FIG. 7B illustrates a perspective view of a coil spool 160 that has a coil 720 wrapped around it. A coil spool 160 may comprise a core 710 disposed between first and second spool plates 705a, 705b. The core 710 may provide a structure around which a coil 720 of wire, such as copper wire, may be wound, as illustrated in FIG. 7B. Wiring the coils together may be configured to provide single or three phase power with only a slight modification to the alignment and/or position of the coil spools 160 on the rotors 150.

The coil spool 160 may also include a plurality of attachment holes 715 through which various attachment mechanisms may pass to secure the coil spool 160 to the stator plate 105. Attachment mechanisms may include, but are not limited to, screws, bolts, nails, pegs, and the like. Other attachment means may also be employed, such as adhesives. The coil spools 160 may also be integrally formed with the stator plate 105 so that they constitute a single piece of material.

The stator plate 105 and coil spools 160 may be made of non-conductive and/or non-ferromagnetic materials, such as plastics, resins, rubbers, or other non-conductive materials. Non-conductive materials may reduce the presence of a CEMF and thus reduce resistance in the generator due to opposing magnetic fields. With non-conductive materials used through the generator, including the stator plates 105 and coil spools 160, little or no CEMF may be produced. The non-ferromagnetic materials used may also substantially decrease resistance due to attraction between various part of the generator 100, such as the coil spools 160, stator plates 105, and magnets 230.

Additionally, the coil spools 160 provide an open configuration for the coils 720 to be exposed to the surrounding air. As discussed above, the rotors 150 rotate within the gaps 130 between the stator plates 105. The magnets 230 may come in close proximity to the coil spools 160 so that an electric current may be efficiently induced in the coils 720. Air within the gaps may be disturbed, causing an airflow within the gaps 130, as the magnets 230 and/or rotors 150 rotate. The coils 720 may be exposed to this airflow due to the open configuration of the coil spools 160, as well as the ventilation holes 610, 210 within the stator plates 105 and rotors 150, so that the coils 720 may be cooled by convective airflow. This would not be the case, for example, if the coils were disposed within a thickness of the stator plates 105 or encased within plastic or other materials.

The convective airflow cooling of the coils may significantly reduce heat generated by the induced electrical current in the coils. As discussed above, substantial resistance may occur, for example, with a heat gain of 40 degrees Celsius. This heat may be reduced with the open configuration of the coils illustrated in FIGS. 6 through 7B. The open configuration of the coils may be preferable in embodiments where the stator plates 105 are not made of conductive materials. Conductive materials used in typical stator plate design may act as a heat sink that draws heat away from the coils. In the embodiments described herein, where the stator plates 105 and coil spools 160 are made from non-conductive materials and therefore do not act as heat sinks, the open configuration may cause the coils to be substantially cooled.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A low resistance generator, comprising:
   a generator shaft having a longitudinal length;
   two or more rotors connected to the generator shaft, including a first end rotor and a second end rotor, each rotor disposed perpendicular to the generator shaft, wherein the rotors are disposed in series with each other so as to form a gap between adjacent rotors, there being a plurality of gaps;
   a plurality of magnets disposed on each rotor and arranged radially around the generator shaft so that north and south poles of each magnet are aligned along the longitudinal length of the generator shaft to form two or more columns of aligned magnets, each column extending from the first end rotor to the second end rotor and parallel to the generator shaft;
   one or more gauss bridges disposed at each of the first end rotor and the second end rotor, each gauss bridge bridging two magnets attached at the first and second end rotors, wherein a gauss bridge at the first end rotor that connects two columns has a corresponding gauss bridge at the second end rotor connecting the same two columns, thus creating a closed magnetic loop comprising two columns of magnets;
   a stator disposed within each of the gaps between the rotors; and
   one or more coils disposed on each stator and therefore between each rotor, the one or more coils exposed to the ambient air,
   wherein each rotor carries 6 magnets arranged concentrically around the generator shaft so that 3 sets of 2 magnets each are formed, wherein the two magnets of each set are connected by a gauss bridge.

2. The low resistance generator of claim 1, wherein each of the one or more coils is shaped similar to the shape of each magnet.

3. The low resistance generator of claim 1, wherein the coils comprise a spool of copper wire.

4. The low resistance generator of claim 1, wherein the one or more coils are wired together in series.

5. A low resistance generator, comprising:
   a generator shaft;
   two or more rotors connected to the generator shaft, including a first end rotor and a second end rotor, each rotor disposed perpendicular to the generator shaft, wherein the rotors are disposed in series with each other so as to form a gap between adjacent rotors, there being a plurality of gaps;

a plurality of magnets disposed on each rotor and arranged radially around the generator shaft to form two or more columns of aligned magnets, each column extending from the first end rotor to the second end rotor and parallel to the generator shaft;

one or more gauss bridges disposed at each of the first and second end rotors, each gauss bridge bridging two magnets attached at the first or second end rotors, wherein a gauss bridge at the first end rotor that connects two columns has a corresponding gauss bridge at the second end rotor connecting the same two columns, thus creating a closed magnetic loop comprising two columns of magnets;

a stator disposed within each of the gaps between the rotors, the stator consisting of non-ferrous material; and one or more coils disposed on each stator and therefore between each rotor, the one or more coils exposed to the ambient air, wherein each rotor carries 6 magnets arranged concentrically around the generator shaft so that 3 sets of 2 magnets each are formed, wherein the two magnets of each set are connected by a gauss bridge.

6. The low resistance generator of claim 5, wherein each gap is equal to or less than 0.875 inches.

7. The low resistance generator of claim 5, wherein the rotors and stator are made of non-conductive material.

8. The low resistance generator of claim 5, wherein the coils are disposed within a thickness of the stator and exposed to ambient air.

9. The low resistance generator of claim 5, further comprising a frame connected to the stator, wherein the frame is made of non-conductive material.

10. The low resistance generator of claim 5, wherein each rotor carries a plurality of magnet pairs arranged concentrically around the generator shaft.

11. A low resistance generator, comprising:

a generator shaft;

two or more rotors connected to the generator shaft, including a first end rotor and a second end rotor, each rotor disposed perpendicular to the generator shaft, wherein the rotors are disposed in series with each other so as to form a gap between adjacent rotors, there being a plurality of gaps;

a plurality of magnets disposed on each rotor and arranged radially around the generator shaft to form two or more columns of aligned magnets, each column extending from the first end rotor to the second end rotor and parallel to the generator shaft;

one or more gauss bridges disposed at each of the first and second end rotors, each gauss bridge bridging two magnets attached at the first or second end rotors, wherein a gauss bridge at the first end rotor that connects two columns has a corresponding gauss bridge at the second end rotor connecting the same two columns, thus creating a closed magnetic loop comprising two columns of magnets;

a stator disposed within each of the gaps between the rotors; and one or more coils disposed on each stator and therefore between each rotor, the one or more coils exposed to the ambient air, wherein each rotor carries 6 magnets arranged concentrically around the generator shaft so that 3 sets of 2 magnets each are formed, wherein the two magnets of each set are connected by a gauss bridge.

12. The low resistance generator of claim 11, wherein the one or more gauss bridges is made from cold rolled steel.

13. The low resistance generator of claim 11, the generator comprising three gauss bridges disposed at each of the first end rotor and the second end rotor.

\* \* \* \* \*